United States Patent [19]

Okamoto et al.

[11] Patent Number: 4,772,061
[45] Date of Patent: Sep. 20, 1988

[54] AIR SPOILER

[75] Inventors: Harutaka Okamoto, Nishikasugai; Tetsumi Ichioka, Iwakura; Takashi Kato, Ichinomiya, all of Japan

[73] Assignees: Daihatsu Motor Company Limited, Ikeda; Toyota Jidosha Kabushiki Kaisha, Toyota, both of Japan

[21] Appl. No.: 16,290

[22] Filed: Feb. 19, 1987

Related U.S. Application Data

[62] Division of Ser. No. 777,076, Sep. 17, 1985, Pat. No. 4,652,036.

[30] Foreign Application Priority Data

Sep. 17, 1984 [JP] Japan ................. 59-194999
Sep. 19, 1984 [JP] Japan ................. 59-141736

[51] Int. Cl.$^4$ ............................................. B62D 35/00
[52] U.S. Cl. ................................. 296/180.1; 296/91
[58] Field of Search ................. 296/1 S, 91, 217; 244/123 (U.S. only)

[56] References Cited

U.S. PATENT DOCUMENTS 2,477,113  7/1949  Campbell ....................... 244/123
3,231,076  1/1966  Freiman ........................ 24/336
3,938,841  2/1976  Glance et al. .................. 293/120
4,274,670  6/1981  Pitzman ........................ 296/1 S
4,323,274  4/1982  Soderberg et al. .............. 296/1 S
4,558,898  12/1985 Deaver ......................... 296/1 S

FOREIGN PATENT DOCUMENTS 2250908  5/1973   Fed. Rep. of Germany ...... 293/120
2555006  6/1977   Fed. Rep. of Germany ...... 296/1 S
2913114  10/1980  Fed. Rep. of Germany ...... 296/1 S
3240492  5/1984   Fed. Rep. of Germany ...... 296/1 S
3347364  7/1984   Fed. Rep. of Germany ...... 296/1 S Primary Examiner—Dennis H. Pedder
Attorney, Agent, or Firm—Cushman, Darby & Cushman

[57] ABSTRACT

The air spoiler includes a blow molded air spoiler body with a plurality of recesses molded in its lower wall and spaced from one another across the back of the automobile body. The recesses each have rising laterally opposite walls and in each recess a securement device is located which is fixed to the spoiler body by molding of the lower wall of the spoiler body. Each securement device can have a screw-threaded fastener threaded into it for securing the spoiler on the rear of the automobile body.

3 Claims, 5 Drawing Sheets

AIR SPOILER

This is a division of application Ser. No. 777,076 filed Sept. 17, 1985, now U.S. Pat. No. 4,652,036.

BACKGROUND OF THE INVENTION

The present invention relates to an air spoiler of the wing type, which is disposed to rear side of a vehicle and pushes the vehicle towards the road surface utilizing the air flow during high-speed running of the vehicle and increases the drive force and the brake force of the vehicle. More particularly, the invention relates to an air spoiler molded of plastics material.

Figure 1:
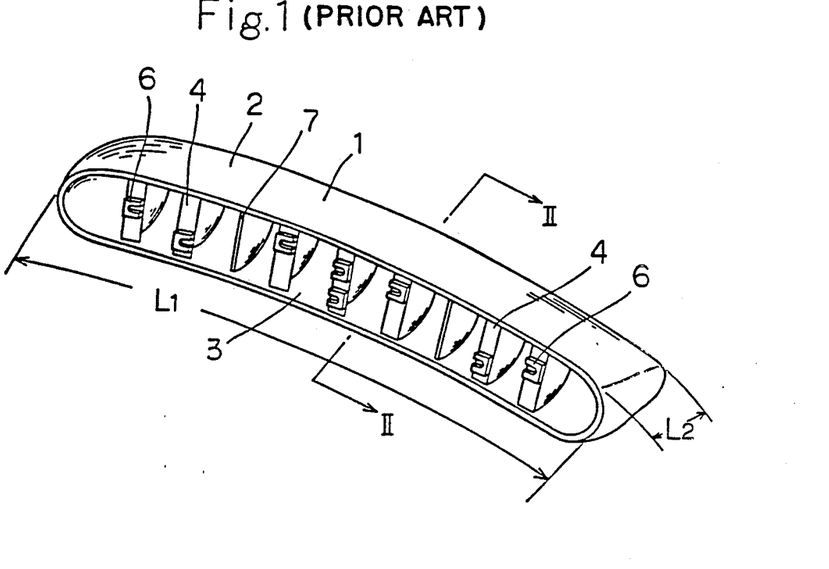
FIG. 1 is a perspective view of an air spoiler in the prior art.
Figure 2:
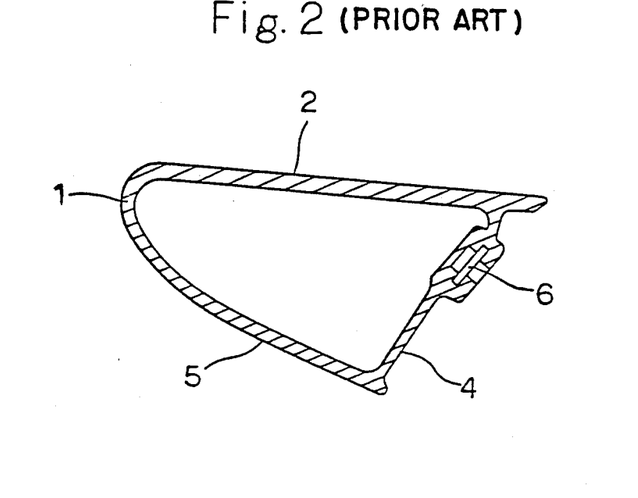
FIG. 2 is a sectional view taken in line II—II of FIG. 1.

An air spoiler in the prior art has the structure which is shown in FIG. 1 and FIG. 2. FIG. 1 is a perspective view of an air spoiler in the prior art, and FIG. 2 is a sectional view of the air spoiler taken in line II—II of FIG. 1.

In the figures, an air spoiler body 1 has length $L_1$ specified depending on the body width of the vehicle to which the air spoiler is installed, and width $L_2$ of an upper surface 2 and slanting angle specified depending on the vehicle speed and the installation position respectively. An opening 3 of the air spoiler body 1 is provided with a plurality of mounting members 4 formed integrally so as to permit installation of the air spoiler to the vehicle. The mounting members 4 have function also as reinforcing members to hold securely the distance between the upper surface 2 and the lower surface 5 of the air spoiler. Each mounting member 4 has cross-section form usually composed of a plane parallel to the longitudinal direction of the air spoiler body 1 and a plane orthogonal thereto. Of course, when the length $L_1$ of the air spoiler body 1 is large and the thickness of the air spoiler body 1 is small, reinforcing members 7 of a required number composed of planes orthogonal to the longitudinal direction of the air spoiler body 1 are formed integrally therewith. Each mounting member 4 is provided with a fitting recess 6 to fit a T-bolt. The air spoiler body 1 is fixed to the vehicle body by the T-bolts fitted to the fitting recesses 6. The fitting recesses 6 are arranged in zig-zag form with respect to the longitudinal direction of the air spoiler body 1; the mounting is thereby stabilized.

Figure 3:
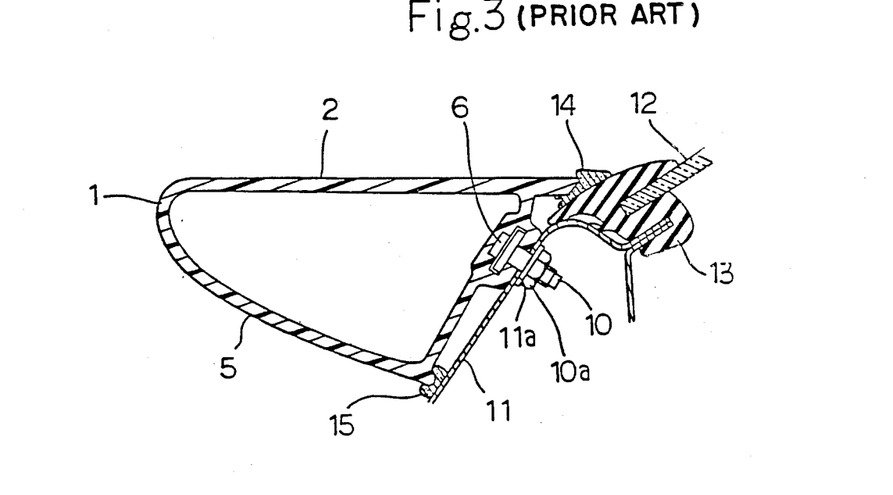
FIG. 3 is a sectional view of the air spoiler in the prior art illustrating the installed state.

FIG. 3 is a sectional view of the air spoiler body 1 in the prior art, illustrating an example of the installed state.

Each T-bolt is fitted to a respective fitting recess 6 of the air spoiler body 1 and inserted in a corresponding mounting hole 11a bored in the vehicle body 11 and threadably engaged with a nut 10a. The ends of the upper surface 2 and the lower surface 5 of the air spoiler abut on the window glass sealing rubber 13 between the rear window glass 12 and the vehicle body 11 or only the vehicle body 11 through elastic bodies 14 and 15, respectively.

The air spoiler body 1 is made of plastics material such as ABS resin by means of injection molding. Particularly, in order to mold the mounting member 4, a slide core is used.

In such an air spoiler, however, sink marks may be produced at the molding position of the joining point between the air spoiler body 1 and the mounting member 4. The sink marks appear as linear dents on the surface of the air spoiler or as wavy forms by depression under some conditions. Particularly, when the sink marks on the upper surface of the air spoiler are subjected to solar reflection, the presence of each such sink mark as an imperfection becomes quite obvious. This is not preferable from the view point of good appearance.

The present invention is directed at providing an air spoiler which does not have such sink mark-type surface imperfections.

SUMMARY OF THE INVENTION

An air spoiler of the invention comprises a mounting assisting member formed integrally on the inside of an air spoiler body between an upper surface and a lower surface of the air spoiler body and extending in the longitudinal direction thereof, and a mounting member with one end joined to the inside of the upper surface of the air spoiler body, the other end of this mounting member being locked to the mounting assisting member. Or an air spoiler is molded in hollow form by means of blow molding, a recess having a rising wall in the width direction is provided at the lower surface of the air spoiler, and a fitting washer is molded integrally to the recess.

Accordingly, an object of the invention is to provide an air spoiler wherein the air spoiler body is made uniform in thickness and can be molded easily, and the fixing between the air spoiler body and the mounting member is effected by joining at one side and by locking at the other side, thereby sink marks and strain marks are not produced on the upper surface of the air spoiler body.

Another object of the invention is to provide an air spoiler which is of light weight and has the required rigidity and the mounting intensity.

BRIEF DESCRIPTION OF THE DRAWINGS

FIG. 9 is an enlarged sectional view taken in line IX—IX of FIG. 6;

FIG. 10 is an enlarged sectional view taken in line X—X of FIG. 6; and

FIG. 11 is a rear perspective view of the air spoiler of FIG. 6.

DESCRIPTION OF THE PREFERRED EMBODIMENTS

Figure 4:
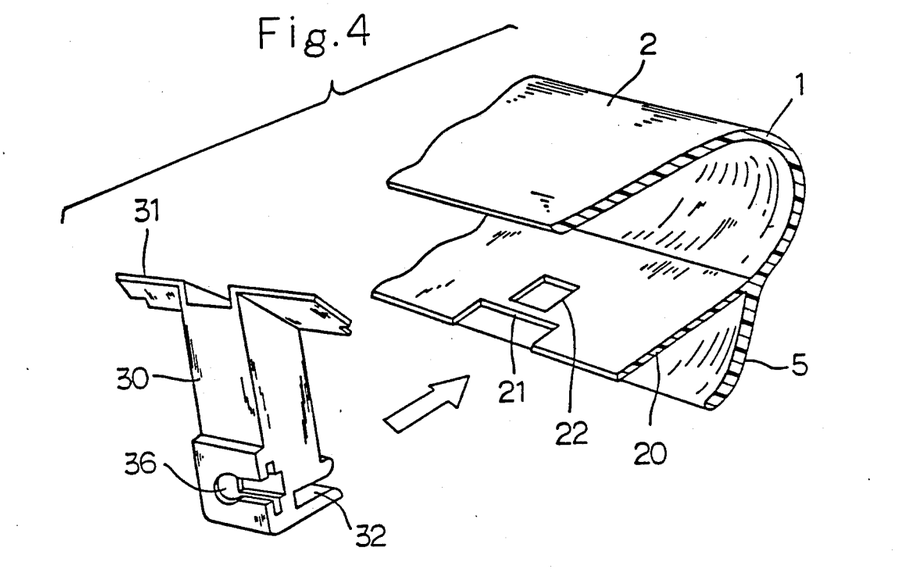
FIG. 4 is a perspective view of assembling parts of an air spoiler as an embodiment of the invention.
Figure 5:
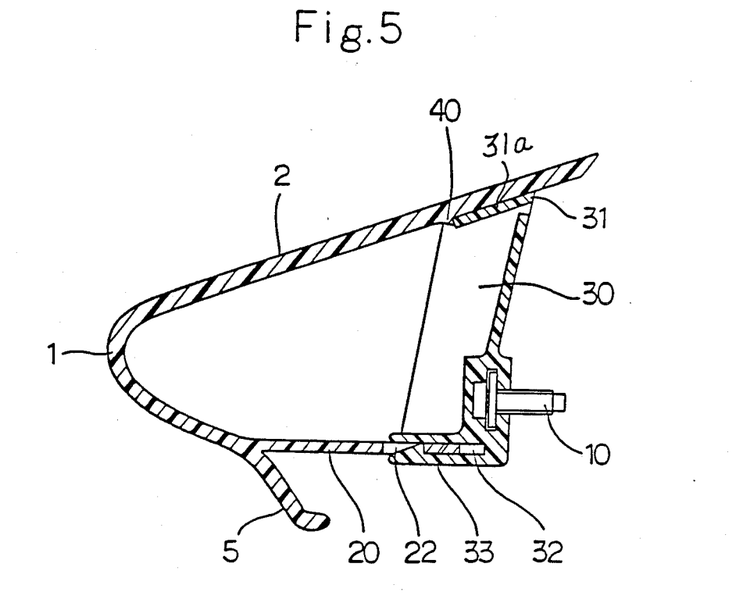
FIG. 5 is a sectional view of the air spoiler illustrating assembled state.
Figure 5A:
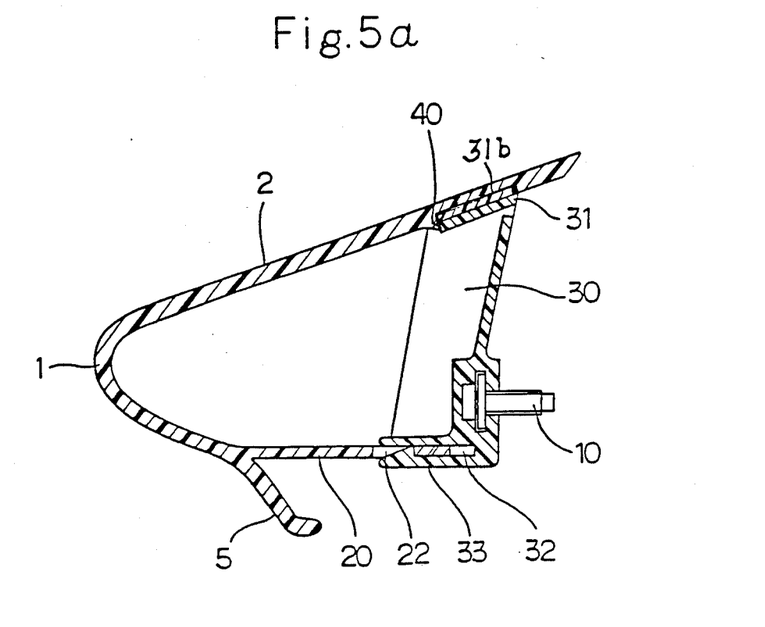
FIG. 5a is a fragmentary sectional view showing adhesion as an alternative means for securing the mounting member to the air spoiler body.
Figure 6:
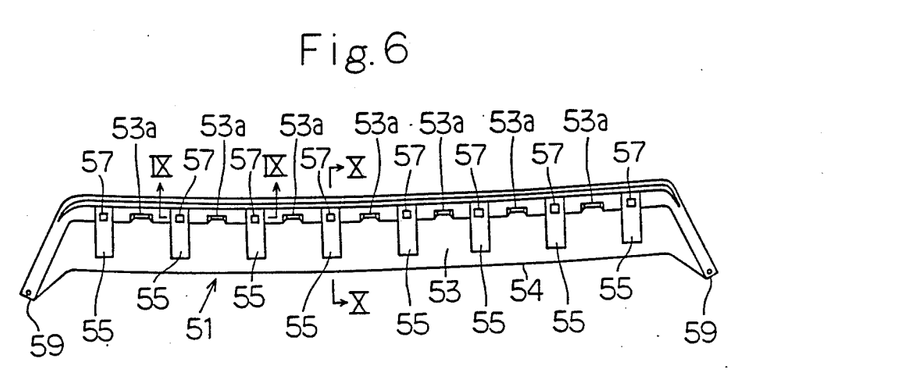
FIG. 6 is a bottom view of an air spoiler as another embodiment of the invention.

FIG. 4 is a perspective view, partly in section, of an air spoiler of a first embodiment of the invention, illustrating the assembly of its constituent parts. FIG. 5 is a sectional view of an air spoiler body with a mounting member assembled thereon.

In the figures, an air spoiler body 1, an upper surface 2 which faces downwardly on an upper wall, a lower surface 5 which faces upwardly on a lower wall. The quently, the air spoiler may be constituted so as not to have sink marks formed in it during the molding process, and strain such as would be apparent as wavy forms on the upper surface of the air spoiler is reduced.

Moreover, the metal mold to be used for molding the air spoiler body may be of simple form; thereby the cost for the metal mold becomes inexpensive.

FIGS. 6 through 11 show an air spoiler of another embodiment of the invention.

The air spoiler body 51 is made of Noryl, PP, ABS resins, for example by means of blow molding, and the inside thereof becomes hollow providing a cavity 51a.

Figure 7:
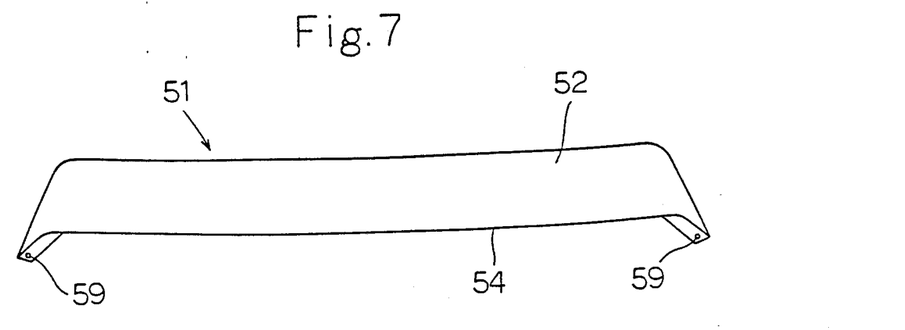
FIG. 7 is a plan view of the air spoiler.
Figure 8:
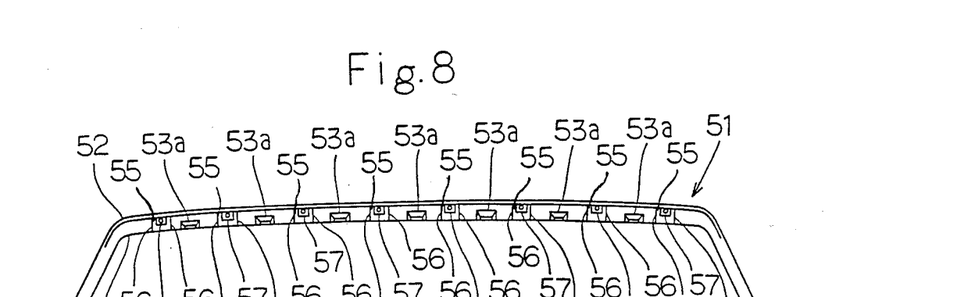
FIG. 8 is a front view of the air spoiler.

The upper surface 52 of the air spoiler 51 has a horizontal portion which is nearly flat, and both of its end portions are smoothly bent downward so as to form end supports (refer to FIG. 7).

The lower surface 53 of the air spoiler body 51 is provided with a number of recesses 55 arranged thereon externally of the hollow cavity 51a, and a fitting washer 57 is fixed integrally to each recess 55 during the blow molding (refer to FIGS. 6, 8, 9, 11). At the site of each recess 55, the upper, inner face of the lower wall 53 abuts the lower, inner face of the upper wall 52 throughout at least part of the lengthwise and widthwise extents of the respective recess.

The recesses 55 are provided with long rising walls 56 in the width direction of the air spoiler body 5 and arranged at regular intervals (The width direction of the air spoiler body 5 is the direction which extends forwardly-rearwardly when the air spoiler body is mounted on the rear of a car body as illustrated in FIG. 10.).

The lower surface 53 and the upper surface 52 of the air spoiler body are shown joined at the rear by a rear surface 54.

A fitting washer 57, of square bar form in the embodiment illustrated, is fixed to a prescribed position of the recess 55, and a mounting hole 58 penetrating in the width direction of the spoiler body 51 is bored on the fitting washer 57 (refer to FIG. 11).

The air spoiler in such a construction is threadably installed to a mounting member 60 arranged to a prescribed position of the car body by a bolt 61 through an opening 60a in the flange 60b of the mounting member 60. The flange 60b projects into a respective recess 55 and abuts a respective fitting washer 57 provided on the lower wall 53 in the respective recess. The bolt 61 is threaded into the mounting hole 58 of the fitting washer 57. A bolt is threadably installed also to a mounting hole 59 at end portion and the air spoiler is by such means thereby installed to a roof rear part 62 as clearly seen in FIG. 10 for example.

The fitting washer 57 is sufficiently thick to enable its being threadedly tapped.

The abutting parts 53a are arranged at intermediate portions of the recesses 55 so as to abut on a number of positions of the roof rear part 62; thereby the joining positions of the air spoiler with the roof rear part 62 are increased and the mounting intensity is further reinforced.

Although the plane figure of the recess 55 is rectangular form in the illustrated embodiment, it may be triangular or oval in form and is not specifically restricted as long as the effective rising wall can be formed in the width direction of the air spoiler body 51.

The fitting washer 57 may be formed integrally with the air spoiler body 51. For example, the fitting washer 57 as separate body may be welded or bonded with the air spoiler body 51.

As above described, the air spoiler body 51 is molded in hollow form by means of blow molding and the fitting washer 57 is molded integrally with the lower surface of the air spoiler body 51. Since no projection is produced at rear side of the upper surface 52 of the air spoiler body 51, the spoiler is not sunk during the molding but can be finished in good appearance.

Since the recesses 55 and the fitting washers 57 therewithin are molded integrally to the lower surface 53 of the air spoiler body 51 by means of the blow molding, the rising walls 56 of a number of arranged recesses 55 provide the air spoiler with the required rigidity and also the sufficient mounting intensity. Moreover, the weight is significantly reduced in comparison to a conventional air spoiler using steel plate inserts, and an air spoiler of low cost can be maufactured.

What is claimed is:

1. An air spoiler comprising:
   (a) an air spoiler body of closed hollow form made of plastic material by means of blow molding so as to have an upper wall and a lower wall whereby a cavity is enclosed by said upper and lower walls;
   (b) a plurality of recesses externally provided in said lower wall of the spoiler body and having two opposite rising walls which extend in a width direction, said lower wall engaging said upper wall within said cavity over each said recess and being spaced from upper wall between said recesses;
   (c) at least one fitting washer installed within each recess and having a mounting hole porvided therein, said fitting washers being fixed to the spoiler body as a consequence of molding of said spoiler body and
   (d) between a plurality of adjacent ones of said recesses, said lower wall having externally provided by molding on said lower wall respective abutting parts arranged to abuttingly support said air spoiler body on an automotive vehicle body surface.

2. An air spoiler for the rear of an automobile body, comprising:
   a hollow, blow molded air spoiler body integrally made of plastic material so as to have an upper wall and a lower wall, these two walls being joined to one another along a rear edge, whereby a cavity is enclosed by said upper and lower walls;
   said spoiler body being elongated so as to have a longitudinal direction thereof adapted to extend transversally of the rear of an automobile body;
   said lower wall of said spoiler body including a plurality of downwardly opening recesses provided therein externally of said cavity, and spaced from one another along the length of said spoiler body, said recesses each including two laterally opposite sidewall portions of substantial extent widthwise of said spoiler body, said lower wall engaging said upper wall within said cavity over each said recess and being spaced from said upper wall between said recesses;
   between a plurality of adjacent ones of said recesses, said bottom wall having externally provided by molding on said lower wall respective abutting parts arranged to abuttingly support said air spoiler body on an automotive vehicle body surface; and
   at least one securement device fixed to said lower wall in each of a plurality of said recesses, each such securement device being adapted to have a respective screw-threaded fastener threaded thereinto for securing said air spoiler on the rear of an automobile body.

3. The air spoiler of claim 2, further including:

a mounting member installed on an automotive vehicle body and having an upwardly projecting flange means provided with an opening therethrough;

said air spoiler body being assembled to said mounting member so that said flange means projects up into at least one of said recesses and abuts said securement device within at least one of said recesses; and a threaded fastener disposed within at least one of said recesses and threadedly engaged in said securement device through said opening in said flange means, thereby securing said air spoiler body to said mounting member.

* * * * *

United States Patent [19]
Janssen et al.

[11] Patent Number: 4,772,062
[45] Date of Patent: Sep. 20, 1988

[54] MOTOR VEHICLE, ESPECIALLY PASSENGER MOTOR VEHICLE

[75] Inventors: Lutz J. Janssen, Munich; Ulrich Bez, Pöcking; Alexander Pregl, Munich; Ronny Martin, Unterhaching; Harm Lagaay, Herrsching, all of Fed. Rep. of Germany

[73] Assignee: Bayerische Motoren Werke Aktiengesellschaft, Munich, Fed. Rep. of Germany

[21] Appl. No.: 79,150

[22] Filed: Jul. 29, 1987

[30] Foreign Application Priority Data

Jul. 30, 1986 [DE] Fed. Rep. of Germany ....... 3625814

[51] Int. Cl.$^4$ .............................................. B62D 35/00
[52] U.S. Cl. ................................ 296/180.5; 296/180.1
[58] Field of Search .......................................... 296/15

[56] References Cited

U.S. PATENT DOCUMENTS

| | | | |
|---|---|---|---|
| 4,379,582 | 4/1983 | Miwa .................................. | 296/1 S |
| 4,455,045 | 6/1984 | Wheeler ............................. | 296/1 S |
| 4,511,170 | 4/1985 | Sankrithi ............................ | 296/1 S |
| 4,569,551 | 2/1986 | Rauser et al. ...................... | 296/1 S |

FOREIGN PATENT DOCUMENTS

| | | |
|---|---|---|
| 0030122 | 6/1981 | European Pat. Off. . |
| 3331583 | 3/1985 | Fed. Rep. of Germany . |
| 1529933 | 5/1968 | France . |
| 63828 | 11/1950 | Japan . |
| 117369 | 2/1954 | Japan . |

*Primary Examiner*—Robert R. Song
*Attorney, Agent, or Firm*—Barnes & Thornburg

[57] ABSTRACT

In a motor vehicle, especially in passenger motor vehicles, its vehicle floor is constructed in the rear area rising toward the vehicle end for achieving a good traction of the vehicle; an air foil with an air foil profile is arranged in the rear diffusor formed thereby at a distance from the road surface that corresponds to the distance of the vehicle body in front of the vehicle rear section of the vehicle so that a negative lift becomes effective at the air foil with an in-flow of air coming from the vehicle front section.

52 Claims, 17 Drawing Sheets

UNITED STATES PATENT AND TRADEMARK OFFICE
CERTIFICATE OF CORRECTION

PATENT NO. : 4,772,061
DATED : September 20, 1988
INVENTOR(S) : Harutaka OKAMOTO, Tetsumi ICHIOKA, Takashi KATO It is certified that error appears in the above-identified patent and that said Letters Patent is hereby corrected as shown below:

ON THE FIRST INFORMATION PAGE:

Please change

"[73] Assignees: Daihatsu Motor Company Limited, Ikeda; Toyota Jidosha Kabushiki Kaisha, Toyota, both of Japan" to --[73] Toyoda Gosei Co., Ltd., Nishikasugai-gun; Daihatsu Motor Company Limited, Ikeda; Toyota Jidosha Kabushiki Kaisha, Toyota, all of Japan--.

Signed and Sealed this

Twenty-eighth Day of November 1989

Attest:

JEFFREY M. SAMUELS

Attesting Officer    Acting Commissioner of Patents and Trademarks